(12) United States Patent
Kaneko et al.

(10) Patent No.: US 11,808,630 B2
(45) Date of Patent: Nov. 7, 2023

(54) FIRST OPTICAL SYSTEM, MONOCHROMATOR, AND OPTICAL APPARATUS

(71) Applicants: Yokogawa Test & Measurement Corporation, Tokyo (JP); YOKOGAWA ELECTRIC CORPORATION, Tokyo (JP)

(72) Inventors: Tsutomu Kaneko, Hachioji (JP); Manabu Kojima, Hachioji (JP)

(73) Assignees: Yokogawa Test & Measurement Corporation, Tokyo (JP); Yokogawa Electric Corporation, Tokyo (JP)

(*) Notice: Subject to any disclaimer, the term of this patent is extended or adjusted under 35 U.S.C. 154(b) by 0 days.

(21) Appl. No.: 17/812,471

(22) Filed: Jul. 14, 2022

(65) Prior Publication Data
US 2023/0036417 A1     Feb. 2, 2023

(30) Foreign Application Priority Data

Jul. 29, 2021  (JP) .................................. 2021-124790

(51) Int. Cl.
   *G01J 3/18*    (2006.01)
   *G01J 3/02*    (2006.01)
   *G01J 3/04*    (2006.01)

(52) U.S. Cl.
   CPC .............. *G01J 3/18* (2013.01); *G01J 3/0208* (2013.01); *G01J 3/0291* (2013.01); *G01J 3/04* (2013.01)

(58) Field of Classification Search
   CPC .............. G01J 3/18; G01J 3/0291; G01J 3/04
   See application file for complete search history.

(56) References Cited

U.S. PATENT DOCUMENTS

| 9,059,564 B2* | 6/2015 | Simanovski .......... H01S 3/1118 |
| 2016/0195433 A1* | 7/2016 | Kaneko ................. G01J 3/0208 |
| | | 359/494.01 |
| 2021/0072158 A1* | 3/2021 | Ilchenko ............... G01J 3/0229 |

FOREIGN PATENT DOCUMENTS

| JP | 2000-88647 A | 3/2000 |
| JP | 2009-175038 A | 8/2009 |

* cited by examiner

*Primary Examiner* — Tarifur R Chowdhury
*Assistant Examiner* — Kemaya Nguyen
(74) *Attorney, Agent, or Firm* — Rankin, Hill & Clark LLP

(57) ABSTRACT

A first optical system (10) according to the present disclosure includes a first lens (111) that guides light (L0) to a diffraction grating (3), a second lens (112) that collimates first diffracted light (L1) that was focused at a first focal point (f1), a pair of first mirrors (12, 13), a third lens (113) that focuses the first diffracted light (L1) at a second focal point (f2), and a fourth lens (114) that guides the first diffracted light (L1) that was focused by the third lens (113) to the diffraction grating (3). The first lens (111) and the fourth lens (114) have a substantially identical first focal length. The second lens (112) and the third lens (113) have a substantially identical second focal length. A first distance along an optical path from the first focal point (f1) to the second focal point (f2) is determined by a first predetermined condition.

10 Claims, 6 Drawing Sheets

FIRST OPTICAL SYSTEM, MONOCHROMATOR, AND OPTICAL APPARATUS

CROSS-REFERENCE TO RELATED APPLICATION

The present application claims priority to Japanese Patent Application No. 2021-124790 filed on Jul. 29, 2021, the entire contents of which are incorporated herein by reference.

TECHNICAL FIELD

The present disclosure relates to a first optical system, a monochromator, and an optical apparatus.

BACKGROUND

Multipass monochromators, for example, are a known way of obtaining high resolution or sharp filter characteristics over a wavelength range. In a multipass monochromator, the light to be measured is caused to be incident on a diffraction grating multiple times and is passed through a slit.

For example, Patent Literature (PTL) 1 discloses a two-stage monochromator with improved wavelength resolution and reduced real length. For example, PTL 2 discloses a multipass monochromator that suppresses the deterioration of spectral resolution and dynamic range that occurs when part of the scattered light generated in a spectroscopic system before the final spectroscopic system follows the same optical path as the diffracted light in the final spectroscopic system.

CITATION LIST

Patent Literature

PTL 1: JP 2000-088647 A
PTL 2: JP 2009-175038 A

SUMMARY

A first optical system according to an embodiment includes a first lens configured to collimate incident light and guide the incident light to a diffraction grating that is rotatable about an axis of rotation; a second lens configured to collimate first diffracted light that was diffracted by the diffraction grating and focused at a first focal point by the first lens; a pair of first mirrors configured to direct the first diffracted light that passed through the second lens back toward the diffraction grating; a third lens configured to focus the first diffracted light directed back by the pair of first mirrors at a second focal point; and a fourth lens configured to collimate the first diffracted light that was focused by the third lens and guide the first diffracted light to the diffraction grating, wherein the first lens and the fourth lens have a substantially identical first focal length, the second lens and the third lens have a substantially identical second focal length, a first distance along an optical path from the first focal point to the second focal point is determined by a first predetermined condition, and the first predetermined condition includes a condition that a shift in a focusing position of the first diffracted light is inverted between the first focal point and the second focal point, the shift depending on an angle between an engraved line extending in one direction and the axis of rotation in the diffraction grating.

DETAILED DESCRIPTION

Figure 1:
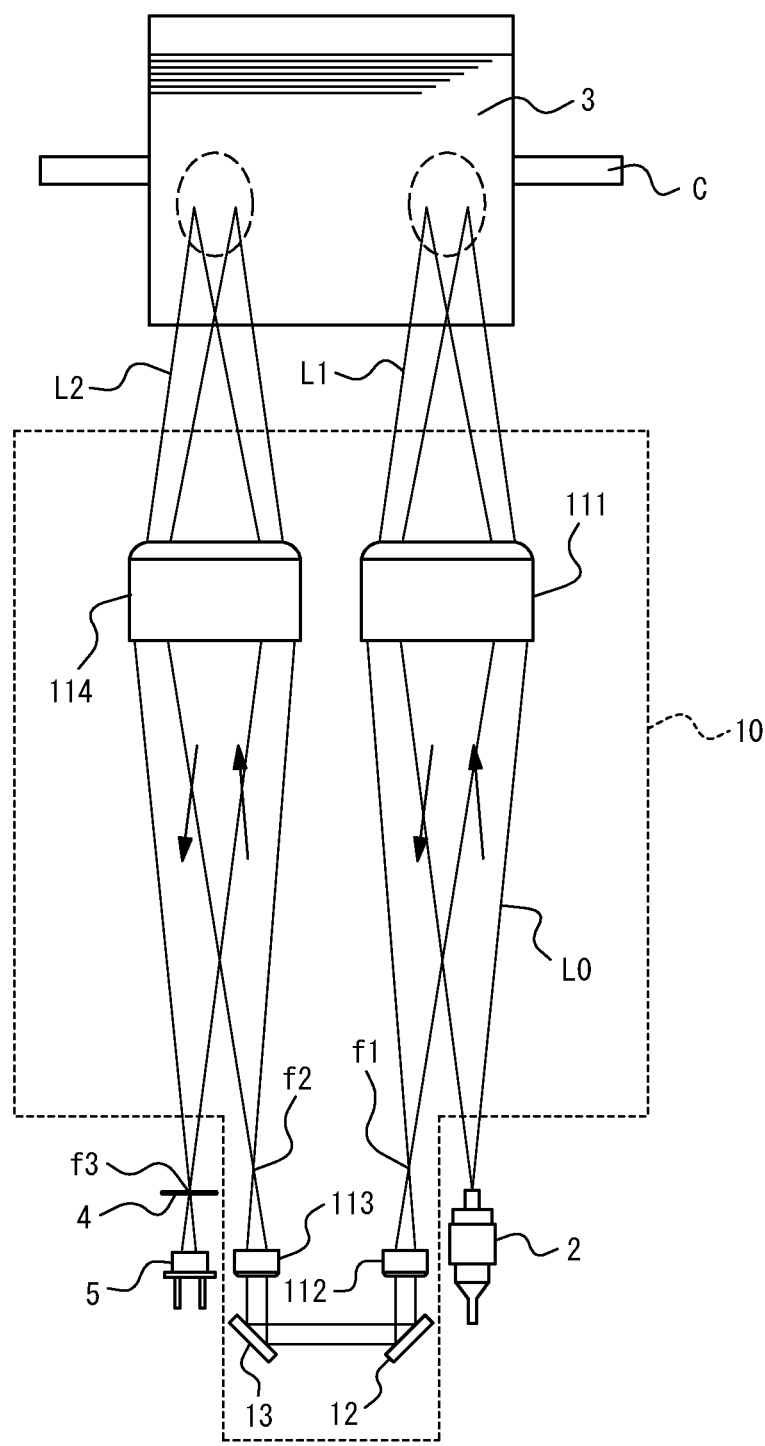
FIG. 1 is a schematic diagram illustrating the configuration of a monochromator according to a first embodiment of the present disclosure.

In such conventional technology, the diffraction grating is mounted on a drive apparatus in a rotatable manner about an axis of rotation in order to select a predetermined wavelength in the monochromator. The diffraction phenomenon occurs along the array direction in which engraved lines extending in one direction are arranged in the diffraction grating. On the other hand, in the direction of engraved lines orthogonal to the array direction, the usual reflection phenomenon occurs such that the angle of incidence and the angle of emission are the same as each other, as in the case of a plane mirror.

At this time, if the engraved lines extending in one direction and the axis of rotation are ideally parallel to each other, the angle of emission in the direction of extension of the engraved lines remains constant even if the diffraction grating rotates about the axis of rotation. However, if the engraved lines extending in one direction and the axis of rotation are not parallel to each other, the angle of emission changes depending on the angle between these engraved lines and the axis of rotation and on the angle of rotation of the diffraction grating. As a result, the diffracted light may not be able to pass through the slit located in the subsequent optical path or be incident on a light-receiving element, depending on the predetermined rotation angle of the diffraction grating.

To avoid such problems insofar as possible, it is necessary to mount the diffraction grating on the drive apparatus so that the engraved lines extending in one direction and the axis of rotation approach an ideal parallel state with respect to each other. Such an operation is difficult and time-consuming.

It would be helpful to provide a first optical system, a monochromator, and an optical apparatus that facilitate operations when mounting a diffraction grating on a drive apparatus.

A first optical system according to an embodiment includes a first lens configured to collimate incident light and guide the incident light to a diffraction grating that is rotatable about an axis of rotation; a second lens configured to collimate first diffracted light that was diffracted by the diffraction grating and focused at a first focal point by the first lens; a pair of first mirrors configured to direct the first diffracted light that passed through the second lens back toward the diffraction grating; a third lens configured to focus the first diffracted light directed back by the pair of first mirrors at a second focal point; and a fourth lens configured to collimate the first diffracted light that was focused by the third lens and guide the first diffracted light to the diffraction grating, wherein the first lens and the fourth lens have a substantially identical first focal length, the second lens and the third lens have a substantially identical second focal length, a first distance along an optical path from the first focal point to the second focal point is determined by a first predetermined condition, and the first predetermined condition includes a condition that a shift in a focusing position of the first diffracted light is inverted between the first focal point and the second focal point, the shift depending on an angle between an engraved line extending in one direction and the axis of rotation in the diffraction grating.

This facilitates operations when mounting the diffraction grating on a drive apparatus. In the first optical system, even if the engraved lines extending in one direction and the axis of rotation are not parallel in the diffraction grating, the shift amount in the focusing position, which depends on the angle between the engraved lines and the axis of rotation and the rotation angle of the diffraction grating, in the non-dispersion direction is zero when viewing the optical system as a whole.

As a result, the focal position of the second diffracted light in the non-dispersion direction is constant at any rotation angle of the diffraction grating, even if the diffraction grating is not mounted on the drive apparatus so as to be ideally parallel to the axis of rotation. Therefore, the second diffracted light of a specific wavelength can pass through a slit located in the optical path after the first optical system, regardless of the rotation angle of the diffraction grating. The second diffracted light can be incident on a light-receiving element located in the optical path after the slit, regardless of the rotation angle of the diffraction grating.

In this way, even if the engraved lines extending in one direction in the diffraction grating and the axis of rotation are not in an ideal parallel state, the monochromator functions properly as an apparatus. In other words, the tolerance for deviation from the ideal parallel state of the diffraction grating with respect to the axis of rotation is improved. High precision is therefore not required for the operation to mount the diffraction grating on the drive apparatus. This mounting operation is thereby facilitated, enabling the mounting operation to be performed in a shorter time. By a reduction in the cost of operations as described above, the monochromator, the optical apparatus in which the monochromator is mounted, and the like are less expensive as products while achieving higher performance.

In the first optical system of an embodiment, the first predetermined condition may include a condition that the first distance is substantially four times the second focal length. As a result, the angle of the direction in which the first diffracted light travels from the second focal point of the third lens matches the angle of the direction of the first diffracted light incident on the second lens. Therefore, use of a fourth lens having the same size as the first lens ensures that the first diffracted light passes through the fourth lens. The user can thus use a lens identical to the first lens as the fourth lens.

In the first optical system of an embodiment, the first focal length may be longer than the second focal length. This increases the distance between the focusing position of the first diffracted light and the first lens. Similarly, this increases the distance between the focusing position of the second diffracted light and the fourth lens. Therefore, the distance between the focusing position of diffracted light based on one wavelength and the focusing position of diffracted light based on another wavelength becomes larger at each focal point. Even if a slit with a narrow slit width is used, it thus becomes easy to extract only a specific wavelength of the second diffracted light. The accuracy of wavelength selection by the monochromator is thereby improved.

A monochromator according to an embodiment includes one of the aforementioned first optical systems, the diffraction grating, and a first slit positioned at a third focal point at which second diffracted light that was diffracted by the diffraction grating is focused by the fourth lens.

This facilitates operations when mounting the diffraction grating on a drive apparatus. In the monochromator, even if the engraved lines extending in one direction and the axis of rotation are not parallel in the diffraction grating, the shift amount in the focusing position, which depends on the angle between the engraved lines and the axis of rotation and the rotation angle of the diffraction grating, in the non-dispersion direction is zero when viewing the optical system as a whole.

As a result, the focal position of the second diffracted light in the non-dispersion direction is constant at any rotation angle of the diffraction grating, even if the diffraction grating is not mounted on the drive apparatus so as to be ideally parallel to the axis of rotation. Therefore, the second diffracted light of a specific wavelength can pass through the first slit located in the optical path after the first optical system, regardless of the rotation angle of the diffraction grating. The second diffracted light can be incident on a light-receiving element located in the optical path after the first slit, regardless of the rotation angle of the diffraction grating.

In this way, even if the engraved lines extending in one direction in the diffraction grating and the axis of rotation are not in an ideal parallel state, the monochromator functions properly as an apparatus. In other words, the tolerance for deviation from the ideal parallel state of the diffraction grating with respect to the axis of rotation is improved. High precision is therefore not required for the operation to mount the diffraction grating on the drive apparatus. This mounting operation is thereby facilitated, enabling the mounting operation to be performed in a shorter time. By a reduction in the cost of operations as described above, the monochromator, the optical apparatus in which the monochromator is mounted, and the like are less expensive as products while achieving higher performance.

A monochromator according to an embodiment further includes a second optical system, wherein the second optical system includes a fifth lens configured to collimate the second diffracted light that was focused at the third focal point by the fourth lens and guide the second diffracted light to the diffraction grating; a sixth lens configured to collimate third diffracted light that was diffracted by the diffraction grating and focused at a fourth focal point by the fifth lens; a pair of second mirrors configured to direct the third diffracted light that passed through the sixth lens back toward the diffraction grating; a seventh lens configured to focus the third diffracted light directed back by the pair of second mirrors at a fifth focal point; and an eighth lens configured to collimate the third diffracted light that was focused by the seventh lens and guide the third diffracted light to the diffraction grating, the fifth lens and the eighth lens have a substantially identical third focal length, the sixth lens and the seventh lens have a substantially identical fourth focal length, a second distance along an optical path from the fourth focal point to the fifth focal point is determined by a second predetermined condition, and the second predetermined condition includes a condition that a shift in a focusing position of the third diffracted light is inverted between the fourth focal point and the fifth focal point, the shift depending on an angle between the engraved line and the axis of rotation.

This increases the number of diffractions by the diffraction grating, thereby enabling light to be extracted with better wavelength accuracy. In other words, the error in the wavelength of light measured by the monochromator decreases.

In the monochromator of an embodiment, the second predetermined condition may include a condition that the second distance is substantially four times the fourth focal length. As a result, the angle of the direction in which the third diffracted light travels from the fifth focal point of the seventh lens matches the angle of the direction of the third diffracted light incident on the sixth lens. Therefore, use of an eighth lens having the same size as the fifth lens ensures that the third diffracted light passes through the eighth lens. The user can thus use a lens identical to the fifth lens as the eighth lens.

In the monochromator of an embodiment, the third focal length may be longer than the fourth focal length. This increases the distance between the focusing position of the third diffracted light and the fifth lens. Similarly, this increases the distance between the focusing position of the fourth diffracted light and the eighth lens. Therefore, the distance between the focusing position of diffracted light based on one wavelength and the focusing position of diffracted light based on another wavelength becomes larger at each focal point. Even if a slit with a narrow slit width is used, it thus becomes easy to extract only a specific wavelength of the fourth diffracted light. The accuracy of wavelength selection by the monochromator is thereby improved.

The monochromator in an embodiment may further include a second slit positioned at a sixth focal point at which fourth diffracted light that was diffracted by the diffraction grating is focused by the eighth lens. It thus becomes easy to extract only a specific wavelength of the fourth diffracted light focused on the sixth focal point.

In the monochromator of an embodiment, the diffraction grating may include a first diffraction grating configured to act optically on light together with the first optical system and a second diffraction grating configured to act optically on light together with the second optical system, and the first diffraction grating and the second diffraction grating may be configured as separate bodies from each other.

This more significantly achieves the above-described effect of facilitating operations when mounting the diffraction grating on a drive apparatus. For example, in the case of mounting two diffraction gratings on a drive apparatus with conventional technology, the operations to mount each diffraction grating on the drive apparatus so that the direction of extension of the engraved lines in the diffraction grating is parallel to the axis of rotation is more complicated than with a single diffraction grating. The monochromator in an embodiment does not require a high degree of precision in the mounting operation for each diffraction grating. Therefore, the effect of facilitating operations when mounting the diffraction gratings on a drive apparatus is even more significantly achieved than with a single diffraction grating.

In addition, the use of two diffraction gratings is more cost-effective than when a single diffraction grating of a larger size is used. The monochromator, the optical apparatus in which the monochromator is mounted, and the like are therefore less expensive as products while achieving higher performance.

An optical apparatus according to an embodiment includes one of the aforementioned monochromators.

This facilitates operations when mounting the diffraction grating on a drive apparatus. In the optical apparatus, even if the engraved lines extending in one direction and the axis of rotation are not parallel in the diffraction grating, the shift amount in the focusing position, which depends on the angle between the engraved lines and the axis of rotation and the rotation angle of the diffraction grating, in the non-dispersion direction is zero when viewing the optical system as a whole.

As a result, the focal position of the diffracted light in the non-dispersion direction is constant at any rotation angle of the diffraction grating, even if the diffraction grating is not mounted on the drive apparatus so as to be ideally parallel to the axis of rotation. Therefore, the diffracted light of a specific wavelength can pass through the slit located in the optical path after the optical system, regardless of the rotation angle of the diffraction grating. The diffracted light can be incident on a light-receiving element located in the optical path after the slit, regardless of the rotation angle of the diffraction grating.

In this way, even if the engraved lines extending in one direction in the diffraction grating and the axis of rotation are not in an ideal parallel state, the optical apparatus functions properly as an apparatus. In other words, the tolerance for deviation from the ideal parallel state of the diffraction grating with respect to the axis of rotation is improved. High precision is therefore not required for the operation to mount the diffraction grating on the drive apparatus. This mounting operation is thereby facilitated, enabling the mounting operation to be performed in a shorter time. By a reduction in the cost of operations as described above, the optical apparatus in which the monochromator is mounted is less expensive as a product while achieving higher performance.

According to the present disclosure, a first optical system, a monochromator, and an optical apparatus that facilitate operations when mounting a diffraction grating on a drive apparatus can be provided.

The background and problems with conventional technology are described in greater detail.

In the two-stage monochromator described in PTL 1, light that is incident through an incidence slit is converted to collimated light by a collimator and is then incident on a diffraction grating. The diffraction grating is a reflective plate, with a plurality of engraved lines extending in parallel at regular intervals, that disperses the incident light and emits the diffracted light. The diffraction grating is configured to be rotatable about an axis of rotation extending in parallel to the direction of extension of the engraved lines in the central area of the diffraction grating by a non-illustrated drive apparatus. The diffraction grating is configured so that the angle relative to the incident light can be changed as desired.

The light dispersed by the diffraction grating is converted to converged light by a collimator and then directed back by means for reflecting back. The light directed back is again converted to collimated light by the collimator and is incident on the diffraction grating. The incident light is emitted from the diffraction grating as diffracted light by the second dispersion. The emitted light is focused by the collimator and selected by an exit slit.

In the monochromator described in PTL 2, light that is incident through an optical fiber, which serves as an incidence slit, is converted to collimated light by a collimator and is then incident on a diffraction grating. The light dispersed by the diffraction grating is focused by the collimator. Light that is directed back by means for reflecting back is incident on the collimator, is converted to collimated light, and is incident again on the diffraction grating. The incident light is emitted from the diffraction grating as diffracted light by the second dispersion. The emitted light is focused by the collimator and extracted by an exit slit.

Figure 6:
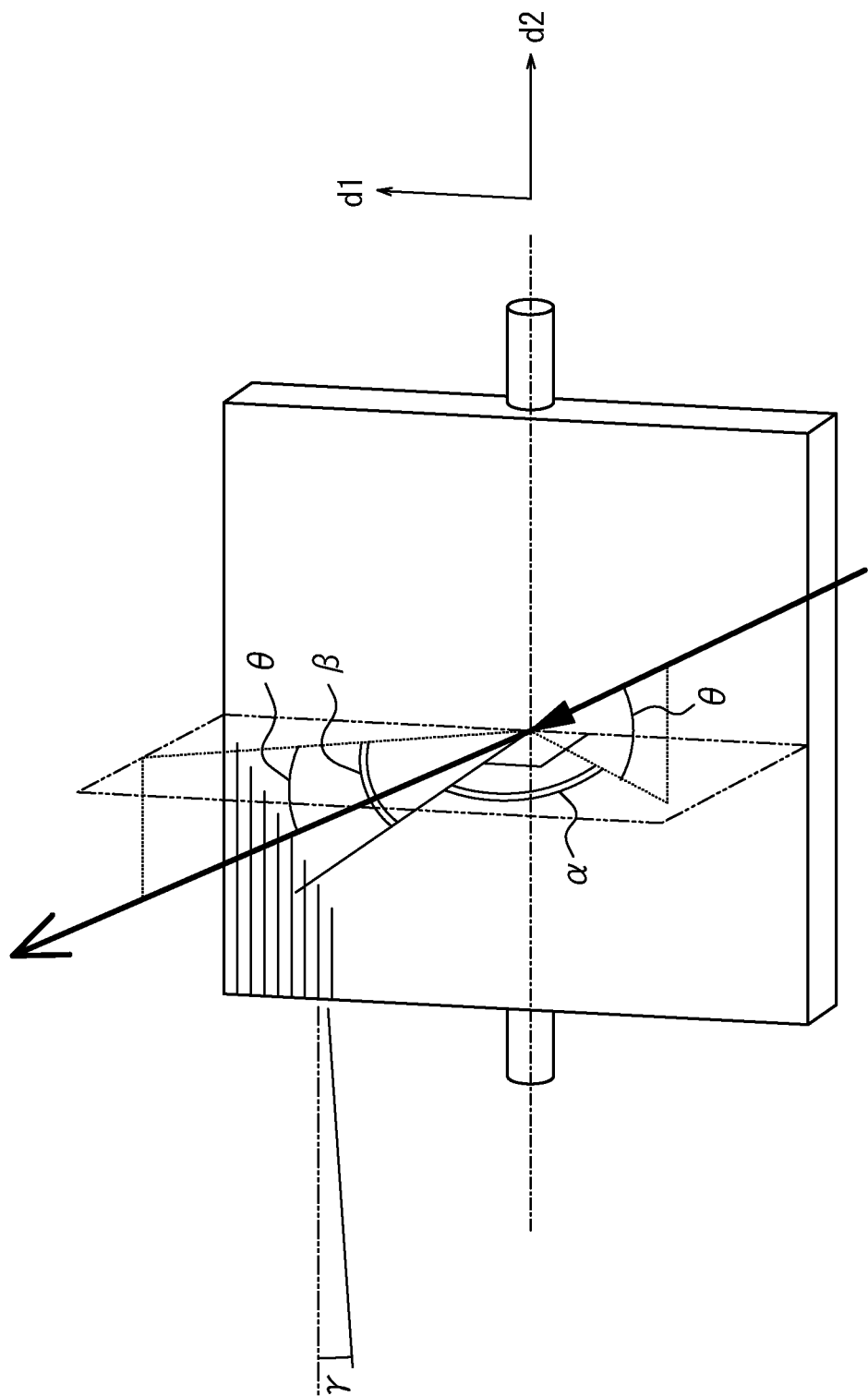
FIG. 6 is a schematic diagram illustrating diffraction and reflection of light in a diffraction grating.

FIG. 6 is a schematic diagram illustrating diffraction and reflection of light in a diffraction grating. The wavelength extracted by the exit slit can be selected by controlling the angle of the diffraction grating. The wavelength is indicated by Equation 1 below.

$$m \cdot \lambda 1 = d \cos\theta \cdot (\sin\alpha + \sin\beta) \quad \text{(Equation 1)}$$

Here, m is the diffraction order, $\lambda 1$ is the wavelength of light, and d is the lattice spacing of the diffraction grating. As illustrated in FIG. 6, $\alpha$ is the angle of incidence of the light to be measured relative to the reflective surface of the diffraction grating, $\beta$ is the angle of emission of the diffracted light relative to the reflective surface of the diffraction grating, and $\theta$ is the angle of incidence and angle of reflection of the light along the direction of extension of the engraved lines in the diffraction grating.

In the dispersion direction, the wavelength to be extracted among the reflected light from the diffraction grating can be selected by controlling the rotation angle of the diffraction grating. In the present specification, the "dispersion direction" includes the array direction in which the engraved lines extending in one direction are arranged in the diffraction grating, such as direction d1 in FIG. 6. On the other hand, in the non-dispersion direction, light is reflected as with a plane mirror, where the angle of incidence $\theta$ and the angle of reflection $\theta$ coincide regardless of the rotation angle. In the present specification, the "non-dispersion direction" includes the direction of extension of the engraved lines extending in one direction in the diffraction grating, such as direction d2 in FIG. 6. The angle of emission of light in the non-dispersion direction is constant, regardless of the rotation angle of the diffraction grating.

If the engraved lines extending in one direction in the diffraction grating and the axis of rotation are not parallel, and the diffraction grating is mounted on the drive apparatus at an inclination of angle $\gamma$, the angle of emission of light in the non-dispersion direction changes by the angle $\gamma$. At this time, rotating the diffraction grating by an angle $\alpha 1$ changes the angle of emission component of the angle $\gamma$ according to the relational expression $\gamma/\cos\alpha 1$.

The diffracted light with a change in angle of emission is focused by the collimator. The shift amount in the non-dispersion direction of the focusing position is proportional to $\sin(\gamma/\cos\alpha 1)$. The focusing position is dependent on the angle $\alpha 1$, which is the rotation angle. As a result, the diffracted light may not be able to pass through the slit located in the subsequent optical path or be incident on a light-receiving element, depending on the predetermined rotation angle of the diffraction grating. The selection and extraction of light will therefore not function properly as a monochromator, making the apparatus non-operational. Although such obstruction to the passage of light could be resolved by widening the slit width, this would make it easy for components other than the necessary light to pass through the slit, resulting in a degradation of the optical characteristics of the monochromator.

To avoid the above-described problems, it is necessary to ensure that the angle of emission in the direction of extension of the engraved lines is constant, regardless of rotation of the diffraction grating. That is, it is necessary to mount the diffraction grating on the drive apparatus so that the engraved lines extending in one direction and the axis of rotation approach an ideal parallel state with respect to each other. Since the drive apparatus and the diffraction grating are usually configured as separate components, much time is spent on the mounting operation to bring these components close to an ideal parallel state.

It would therefore be helpful to provide a first optical system, a monochromator, and an optical apparatus that facilitate operations when mounting the diffraction grating on the drive apparatus. Embodiments of the present disclosure are mainly described below with reference to the drawings.

First Embodiment

Figure 2:
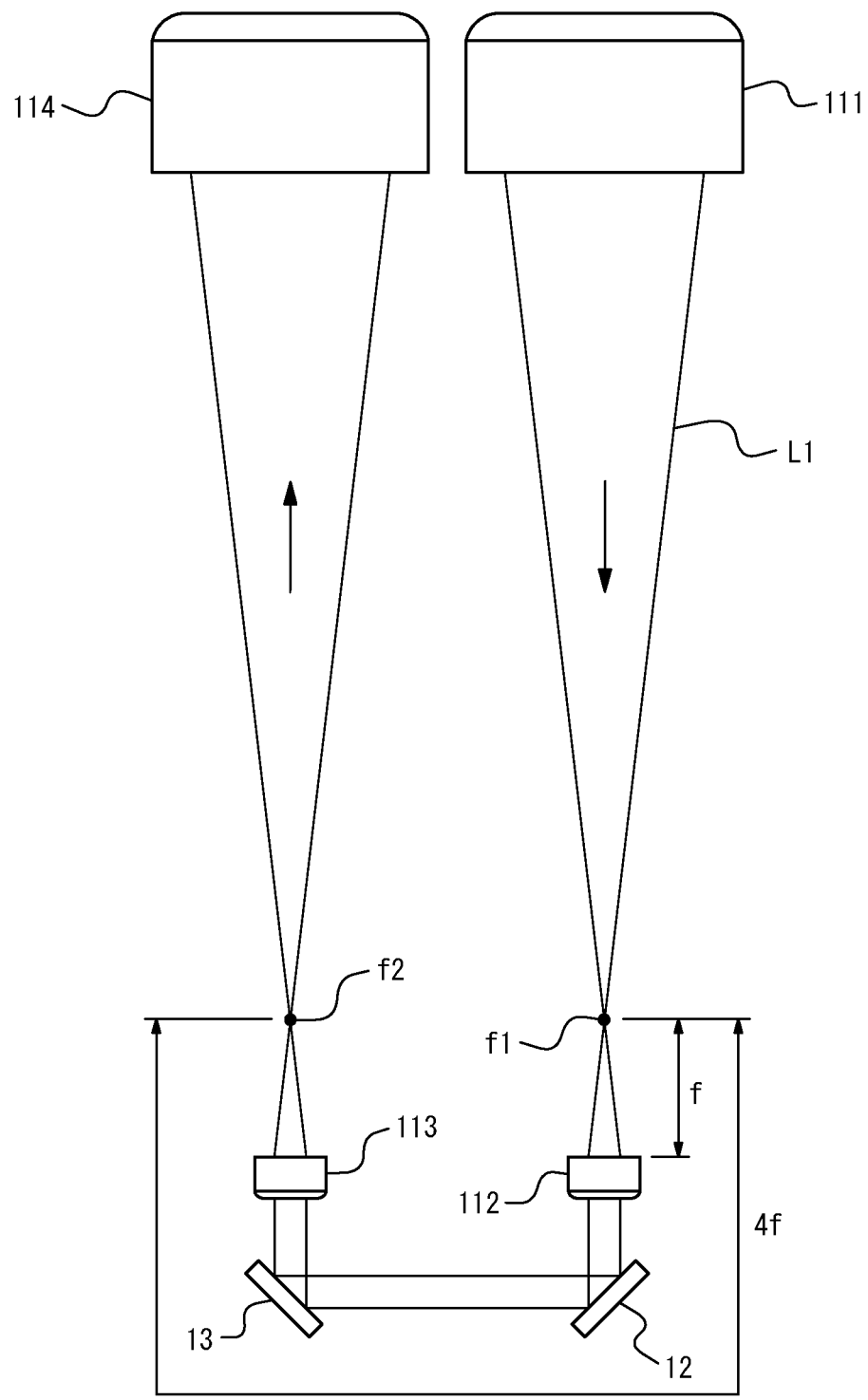
FIG. 2 is a schematic diagram illustrating only the configuration of an optical system of FIG. 1.

FIG. 1 is a schematic diagram illustrating the configuration of a monochromator 1 according to a first embodiment of the present disclosure. FIG. 2 is a schematic diagram illustrating only the configuration of an optical system 10 of FIG. 1. With reference to FIGS. 1 and 2, the configuration and functions of the monochromator according to the first embodiment are mainly described.

The monochromator 1 uses the diffraction phenomenon to extract only diffracted light of a specific wavelength from the light incident from an optical fiber 2. As major constituent elements, the monochromator 1 includes the optical system 10, a diffraction grating 3, a slit 4, and a light-receiving element 5.

The optical system 10 includes a first lens 111, a second lens 112, a mirror 12, a mirror 13, a third lens 113, and a fourth lens 114 arranged in order along the optical path from the optical fiber 2.

The first lens 111 collimates the light L0 incident from the optical fiber 2, which also serves as the input slit, and guides the light L0 to the diffraction grating 3, which can rotate about the rotation axis C. The first lens 111 acts on first diffracted light L1 diffracted by the diffraction grating 3 to focus the first diffracted light L1 at a first focal point f1. The second lens 112 collimates the first diffracted light L1 that was focused at the first focal point f1 by the first lens 111 and diffused again.

The pair of mirrors 12, 13 directs the first diffracted light L1 that passed through the second lens 112 back toward the diffraction grating 3. The mirror 12 reflects the first diffracted light L1 collimated by the second lens 112 toward the mirror 13 at an angle equal to or near 90°. The mirror 13 further reflects the first diffracted light L1, which was reflected by the mirror 12, toward the third lens 113 at an angle equal to or near 90°.

The third lens 113 focuses the first diffracted light L1, which was directed back by the pair of mirrors 12, 13, at a second focal point f2. The fourth lens 114 collimates the first diffracted light L1, which was focused at the second focal point f2 by the third lens 113 and diffused again, and guides the first diffracted light L1 to the diffraction grating 3. The fourth lens 114 acts on second diffracted light L2 diffracted by the diffraction grating 3 to focus the second diffracted light L2 at a third focal point f3.

The slit 4 is positioned at a third focal point f3 at which the second diffracted light L2 that was diffracted by the diffraction grating 3 is focused by the fourth lens 114. The slit 4 extracts only the second diffracted light L2 of a specific wavelength. The light-receiving element 5 receives only the second diffracted light L2 of the specific wavelength that passed through the slit 4. The monochromator 1 measures the light intensity of the second diffracted light L2 received by the light-receiving element 5.

The first lens 111 and the fourth lens 114 have a substantially identical first focal length. In other words, the first lens 111 and the fourth lens 114 have first focal lengths that are identical or similar to each other. The second lens 112 and the third lens 113 have a substantially identical second focal length. In other words, the second lens 112 and the third lens 113 have second focal lengths that are identical or similar to each other. The first focal length is longer than the second focal length.

As illustrated in FIG. 2, the distance along the optical path from the first focal point f1 to the second focal point f2 is determined by a predetermined condition. The predetermined condition is that the shift in the focusing position of the first diffracted light L1 is inverted between the first focal point f1 and the second focal point f2, the shift depending on the angle between the engraved lines extending in one direction and the axis of rotation C in the diffraction grating 3. More specifically, the predetermined condition includes the condition that the aforementioned distance is substantially four times the second focal length f. That is, the predetermined condition includes the condition that the aforementioned distance is four times the second focal length f or is the product of the second focal length f and a value near four.

The predetermined condition is not limited to the condition that the distance along the optical path from the first focal point f1 to the second focal point f2 is substantially four times the second focal length f and may include any condition such that the first diffracted light L1 that passes through the second focal point f2 and diffuses is within the size of the fourth lens 114.

According to the first embodiment as described above, the operation to mount the diffraction grating 3 on the drive apparatus is facilitated. In the optical system 10 and the monochromator 1, even if the engraved lines extending in one direction and the axis of rotation C are not parallel in the diffraction grating 3, the shift amount in the focusing position, which depends on the angle between the engraved lines and the axis of rotation C and the rotation angle of the diffraction grating 3, in the non-dispersion direction is zero when viewing the optical system 10 as a whole.

More specifically, the shift in the non-dispersion direction of the focusing position of the first diffracted light L1 at the second focal point f2 is inverted relative to the shift in the non-dispersion direction of the focusing position of the first diffracted light L1 at the first focal point f1. Further diffraction of the first diffracted light L1 by the diffraction grating 3 produces a shift in the second diffracted light L2 at the third focal point f3 identical to the shift at the first focal point f1, thereby canceling out the shift at the second focal point f2 to yield a shift of zero at the third focal point f3.

As a result, the focal position of the second diffracted light L2 in the non-dispersion direction is constant at any rotation angle of the diffraction grating 3, even if the diffraction grating 3 is not mounted on the drive apparatus so as to be ideally parallel to the axis of rotation C. Therefore, the second diffracted light L2 of a specific wavelength can pass through the slit 4 located in the optical path after the optical system 10, regardless of the rotation angle of the diffraction grating 3. The second diffracted light L2 can be incident on the light-receiving element 5 located in the optical path after the slit 4, regardless of the rotation angle of the diffraction grating 3.

In this way, even if the engraved lines extending in one direction in the diffraction grating 3 and the axis of rotation C are not in an ideal parallel state, the monochromator 1 functions properly as an apparatus. In other words, the tolerance for deviation from the ideal parallel state of the diffraction grating 3 with respect to the axis of rotation C is improved. High precision is therefore not required for the operation to mount the diffraction grating 3 on the drive apparatus. This mounting operation is thereby facilitated, enabling the mounting operation to be performed in a shorter time. By a reduction in the cost of operations as described above, the monochromator 1, the optical apparatus in which the monochromator 1 is mounted, and the like are less expensive as products while achieving higher performance.

Figure 3:
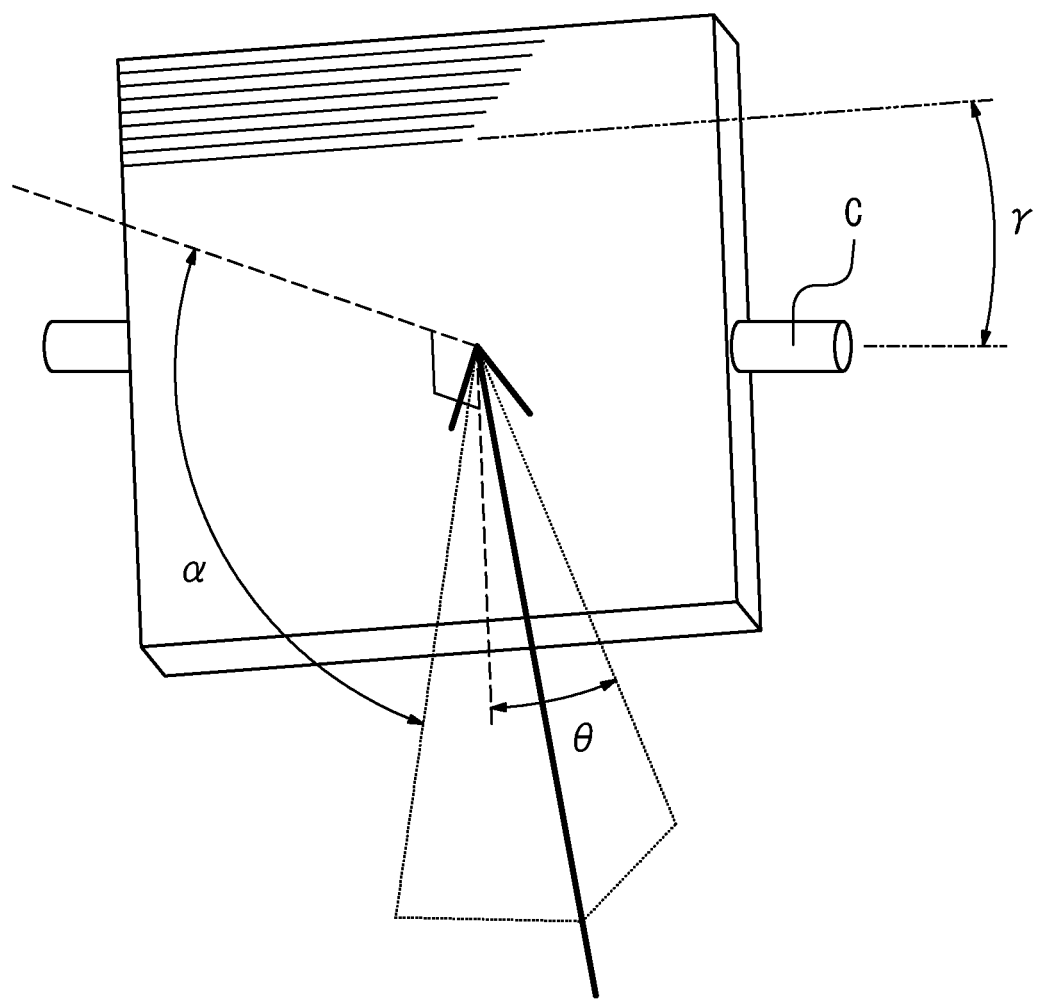
FIG. 3 is a schematic diagram illustrating incidence of light on a diffraction grating.

FIG. 3 is a schematic diagram illustrating incidence of light on the diffraction grating 3. With reference to FIG. 3, the above-described effects will be explained more rigorously with the use of mathematical formulas.

In a case in which the direction of extension of the engraved lines in the diffraction grating 3 is displaced by an angle $\gamma$ with respect to the axis of rotation C, the focusing position of the first diffracted light L1, focused by the first lens 111, in the non-dispersion direction at the first focal point f1 is expressed by $f(\sin\theta - \sin(\gamma/\cos\alpha))$, compared to the position when the angle $\gamma$ is zero. Here, f is the second focal length, $\theta$ is the angle of incidence of light along the direction of extension of the engraved lines in the diffraction grating 3, and $\alpha$ is the angle between a perpendicular to the reflective surface of the diffraction grating 3 and the diffusion direction component of incident light. The light focusing position of the first diffracted light L1 at the first focal point f1 is shifted by an amount proportional to $-\sin(\gamma/\cos\alpha)$ in a direction perpendicular to the optical axis, for example, the left-right direction on paper in FIG. 2, compared to when the angle $\gamma\theta$ is zero.

Such a shift of the focusing position at the first focal point f1 by the first lens 111 is inverted to an amount proportional to $+\sin(\gamma/\cos\alpha)$ by the first diffracted light L1 passing through the second lens 112, the pair of mirrors 12, 13, and the third lens 113. More specifically, the focusing position of the first diffracted light L1 in the non-dispersion direction at the second focal point f2 is expressed by $f(\sin\theta + \sin(\gamma/\cos\alpha))$.

The first diffracted light L1 incident on the fourth lens 114 from the focusing position represented by $f(\sin\theta + \sin(\gamma/\cos\alpha))$ at the second focal point f2 is converted to collimated light and is incident again on the diffraction grating 3. At this time, similar to the initial incidence of the light L0 on the diffraction grating 3, the focusing position of the second diffracted light L2 at the third focal point f3 is shifted by an amount proportional to $-\sin(\gamma/\cos\alpha)$. Therefore, the error proportional to $+\sin(\gamma/\cos\alpha)$ with the sign inverted, which occurs at the second focal point f2, is offset by the error proportional to $-\sin(\gamma/\cos\alpha)$ produced by the second reflection at the diffraction grating 3.

As a result, the focusing position of the second diffracted light L2 focused by the fourth lens 114 is expressed by $f(\sin\theta)$ and does not depend on the angle $\gamma$. In other words, this corresponds to the focusing position in the case of the rotation axis C being parallel to the direction of extension of the engraved lines in the diffraction grating 3 and the angle $\gamma$ being zero. The focusing position of the second diffracted light L2 is constant, regardless of the rotation angle of the diffraction grating 3.

By the predetermined condition including a condition that the distance along the optical path from the first focal point f1 to the second focal point f2 is substantially four times the second focal length f, the angle of the direction in which the first diffracted light L1 travels from the second focal point f2 of the third lens 113 matches the angle of the direction of the first diffracted light L1 incident on the second lens 112. Therefore, use of a fourth lens 114 having the same size as the first lens 111 ensures that the first diffracted light L1 passes through the fourth lens 114. The user can thus use a lens identical to the first lens 111 as the fourth lens 114.

By the first focal length being longer than the second focal length f, the distance between the focusing position of the first diffracted light L1 and the first lens 111 increases. Similarly, this increases the distance between the focusing position of the second diffracted light L2 and the fourth lens 114. Therefore, the distance between the focusing position of diffracted light based on one wavelength and the focusing position of diffracted light based on another wavelength becomes larger at each focal point. Even if a slit 4 with a narrow slit width is used, it thus becomes easy to extract only a specific wavelength of the second diffracted light L2. The accuracy of wavelength selection by the monochromator 1 is thereby improved.

Second Embodiment

Figure 4:
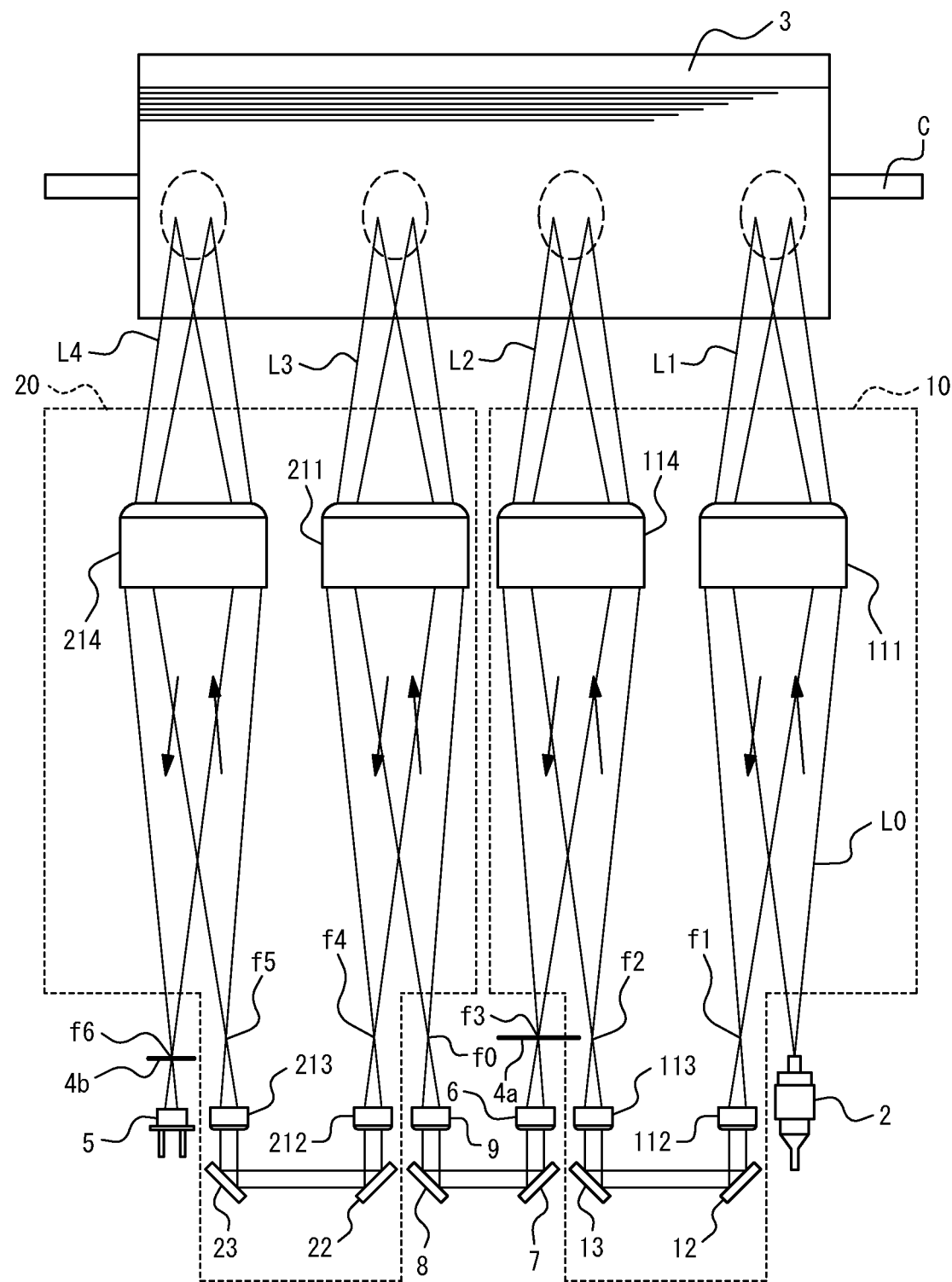
FIG. 4 is a schematic diagram illustrating the configuration of a monochromator according to a second embodiment of the present disclosure.

FIG. 4 is a schematic diagram illustrating the configuration of a monochromator 1 according to a second embodiment of the present disclosure. With reference to FIG. 4, the configuration and functions of the monochromator 1 according to the second embodiment are mainly described.

The second embodiment differs from the first embodiment in that the monochromator 1 includes a second optical system 20 in addition to the optical system 10 serving as the first optical system, and light is diffracted by the diffraction grating 3 four times instead of twice. The other configurations, functions, effects, variations, and the like are the same as those of the first embodiment, and the corresponding descriptions apply to the monochromator 1 according to the second embodiment. Configurations that are the same as in the first embodiment are labeled below with the same reference signs, and a description thereof is omitted. The configurations and functions that differ from the first embodiment will mainly be explained.

The monochromator 1 according to the second embodiment has an optical system further including a second optical system 20 between the slit 4 and the light-receiving element 5 of the monochromator 1 according to the first embodiment. The monochromator 1 has an optical system 10 as the first optical system, a diffraction grating 3, a first slit 4a, a lens 6, a mirror 7, a mirror 8, a lens 9, the second optical system 20, a second slit 4b, and a light-receiving element 5.

The lens 6 collimates the second diffracted light L2 of a specific wavelength that passes through the first slit 4a and diffuses again. The pair of mirrors 7, 8 directs the second diffracted light L2 that passed through the lens 6 back toward the diffraction grating 3. The mirror 7 reflects the second diffracted light L2 collimated by the lens 6 toward the mirror 8 at an angle equal to or near 90°. The mirror 8 further reflects the second diffracted light L2, which was reflected by the mirror 7, toward the lens 9 at an angle equal to or near 90°. The lens 9 focuses the second diffracted light L2, which was directed back by the pair of mirrors 7, 8, at a focal point f0.

The second optical system 20 includes a fifth lens 211, a sixth lens 212, a mirror 22, a mirror 23, a seventh lens 213, and an eighth lens 214 arranged in order along the optical path of the second diffracted light L2 focused on the focal point f0.

The fifth lens 211 collimates the second diffracted light L2, which was focused at the third focal point f3 by the fourth lens 114 of the optical system 10, and guides the second diffracted light L2 to the diffraction grating 3. More specifically, the fifth lens 211 collimates the second diffracted light L2, which was focused at the focal point f0 by the lens 9 and diffused again, and guides the second diffracted light L2 to the diffraction grating 3. The fifth lens 211 acts on third diffracted light L3 diffracted by the diffraction grating 3 to focus the third diffracted light L3 at a fourth focal point f4. The sixth lens 212 collimates the third diffracted light L3 that was focused at the fourth focal point f4 by the fifth lens 211 and diffused again.

The pair of mirrors 22, 23 directs the third diffracted light L3 that passed through the sixth lens 212 back toward the diffraction grating 3. The mirror 22 reflects the third diffracted light L3 collimated by the sixth lens 212 toward the mirror 23 at an angle equal to or near 90°. The mirror 23 further reflects the third diffracted light L3, which was reflected by the mirror 22, toward the seventh lens 213 at an angle equal to or near 90°.

The seventh lens 213 focuses the third diffracted light L3, which was directed back by the pair of mirrors 22, 23, at a fifth focal point f5. The eighth lens 214 collimates the third diffracted light L3, which was focused at the fifth focal point f5 by the seventh lens 213 and diffused again, and guides the third diffracted light L3 to the diffraction grating 3. The eighth lens 214 acts on fourth diffracted light L4 diffracted by the diffraction grating 3 to focus the fourth diffracted light L4 at a sixth focal point f6.

The second slit 4b is positioned at a sixth focal point f6 at which the fourth diffracted light L4 that was diffracted by the diffraction grating 3 is focused by the eighth lens 214. The second slit 4b extracts only the fourth diffracted light L4 of a specific wavelength. The light-receiving element 5 receives only the fourth diffracted light L4 of the specific wavelength that passed through the second slit 4b. The monochromator 1 measures the light intensity of the fourth diffracted light L4 received by the light-receiving element 5.

The fifth lens 211 and the eighth lens 214 have a substantially identical third focal length. In other words, the fifth lens 211 and the eighth lens 214 have third focal lengths that are identical or similar to each other. The sixth lens 212 and the seventh lens 213 have a substantially identical fourth focal length. In other words, the sixth lens 212 and the seventh lens 213 have fourth focal lengths that are identical or similar to each other. The third focal length is longer than the fourth focal length. The third focal length may be identical to the first focal length. The fourth focal length may be identical to the second focal length.

As in FIG. 2, the distance along the optical path from the fourth focal point f4 to the fifth focal point f5 is determined by a predetermined condition. The predetermined condition is that the shift in the focusing position of the third diffracted light L3 is inverted between the fourth focal point f4 and the fifth focal point f5, the shift depending on the angle between the engraved lines extending in one direction and the axis of rotation C in the diffraction grating 3. More specifically, the predetermined condition includes the condition that the aforementioned distance is substantially four times the fourth focal length f. That is, the predetermined condition includes the condition that the aforementioned distance is four times the fourth focal length f or is the product of the fourth focal length f and a value near four.

The predetermined condition is not limited to the condition that the distance along the optical path from the fourth focal point f4 to the fifth focal point f5 is substantially four times the fourth focal length f and may include any condition such that the third diffracted light L3 that passes through the fifth focal point f5 and diffuses is within the size of the eighth lens 214.

According to the monochromator 1 of the second embodiment as described above, the number of diffractions by the diffraction grating 3 is increased, thereby enabling light to be extracted with better wavelength accuracy. In other words, the error in the wavelength of light measured by the monochromator 1 decreases.

By the predetermined condition including a condition that the distance along the optical path from the fourth focal point f4 to the fifth focal point f5 is substantially four times the second focal length f, the angle of the direction in which the third diffracted light L3 travels from the fifth focal point f5 of the seventh lens 213 matches the angle of the direction of the third diffracted light L3 incident on the sixth lens 212. Therefore, use of an eighth lens 214 having the same size as the fifth lens 211 ensures that the third diffracted light L3 passes through the eighth lens 214. The user can thus use a lens identical to the fifth lens 211 as the eighth lens 214.

By the third focal length being longer than the fourth focal length f, the distance between the focusing position of the third diffracted light L3 and the fifth lens 211 increases. Similarly, this increases the distance between the focusing position of the fourth diffracted light L4 and the eighth lens 214. Therefore, the distance between the focusing position of diffracted light based on one wavelength and the focusing position of diffracted light based on another wavelength becomes larger at each focal point. Even if a second slit 4b with a narrow slit width is used, it thus becomes easy to extract only a specific wavelength of the fourth diffracted light L4. The accuracy of wavelength selection by the monochromator 1 is thereby improved.

By the monochromator 1 including the second slit 4b positioned at the sixth focal point f6 at which the fourth diffracted light L4 that was diffracted by the diffraction grating 3 is focused by the eighth lens 214, it becomes easy to extract only a specific wavelength of the fourth diffracted light L4 focused on the sixth focal point f6.

Third Embodiment

Figure 5:
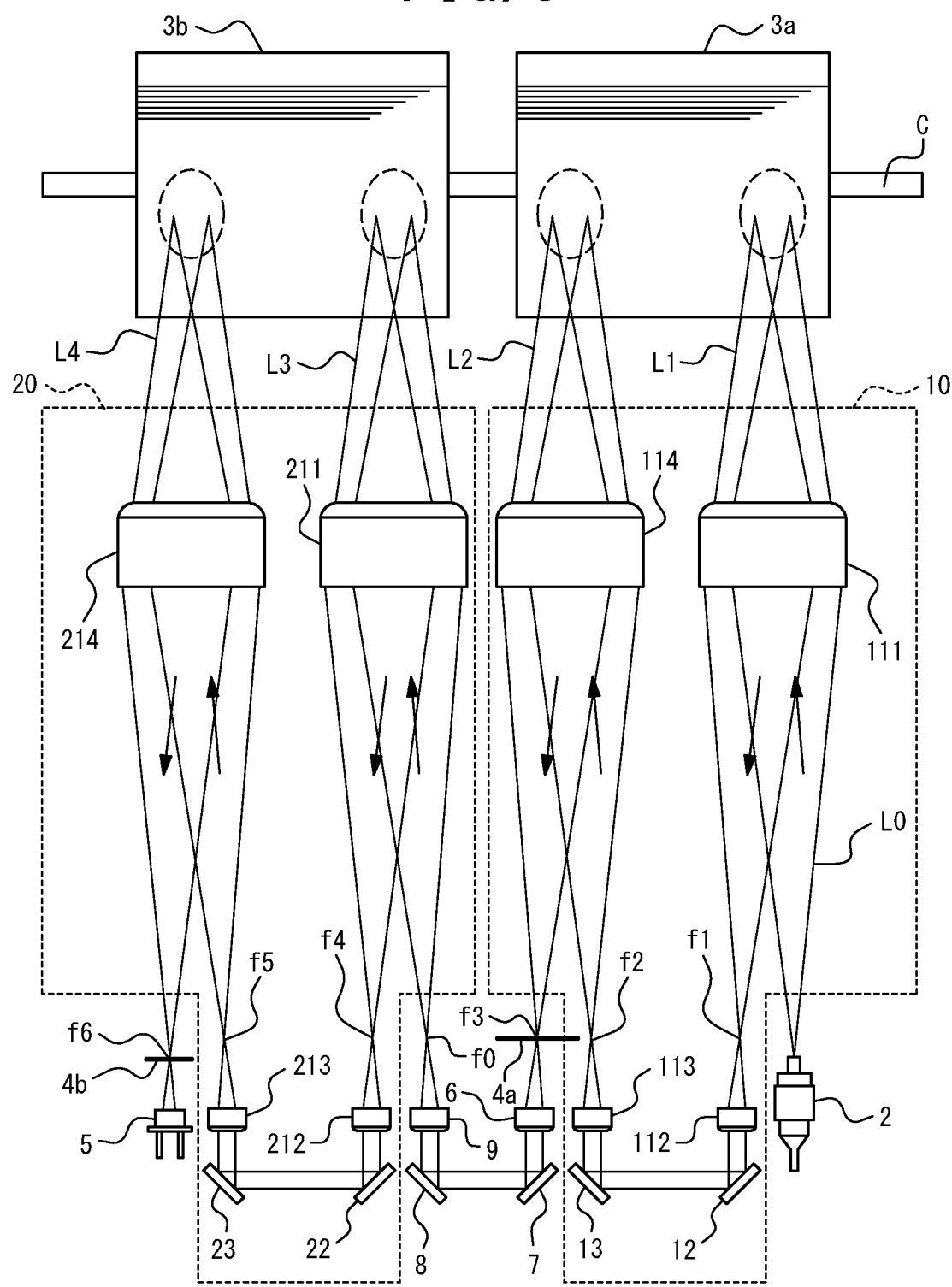
FIG. 5 is a schematic diagram illustrating the configuration of a monochromator according to a third embodiment of the present disclosure.

FIG. 5 is a schematic diagram illustrating the configuration of a monochromator 1 according to a third embodiment of the present disclosure. With reference to FIG. 5, the configuration and functions of the monochromator 1 according to the third embodiment are mainly described.

The third embodiment differs from the second embodiment in that light is diffracted not by a single diffraction grating 3 but by a pair of a first diffraction grating 3a and a second diffraction grating 3b. The other configurations, functions, effects, variations, and the like are the same as those of the second embodiment, and the corresponding descriptions apply to the monochromator 1 according to the third embodiment. Configurations that are the same as in the second embodiment are labeled below with the same reference signs, and a description thereof is omitted. The configurations and functions that differ from the second embodiment will mainly be explained.

The diffraction grating 3 includes a first diffraction grating 3a that acts optically on light together with an optical system 10 as a first optical system and a second diffraction grating 3b that acts optically on the light together with a second optical system 20. More specifically, the first diffraction grating 3a acts on light L0 to generate first diffracted light L1. The first diffraction grating 3a acts on the first diffracted light L1 to generate second diffracted light L2. The second diffraction grating 3b acts on the second diffracted light L2 to generate third diffracted light L3. The second diffraction grating 3b acts on the third diffracted light L3 to generate fourth diffracted light L4. The first diffraction grating 3a and the second diffraction grating 3b are configured as separate bodies from each other.

The monochromator 1 of the third embodiment as described above more significantly achieves the effects of the first embodiment. For example, in the case of mounting two diffraction gratings 3 on a drive apparatus with conventional technology, the operations to mount each diffraction grating 3 on the drive apparatus so that the direction of extension of the engraved lines in the diffraction grating 3 is parallel to the axis of rotation C is more complicated than with a single diffraction grating 3. The monochromator 1 according to the third embodiment does not require a high degree of precision in the mounting operation for each diffraction grating 3. Therefore, the effect of facilitating operations when mounting the diffraction gratings 3 on a drive apparatus is even more significantly achieved than with a single diffraction grating 3.

In addition, the use of two diffraction gratings 3 is more cost-effective than when a single diffraction grating 3 of a larger size is used. The monochromator 1, the optical apparatus in which the monochromator 1 is mounted, and the like are therefore less expensive as products while achieving higher performance.

It will be clear to a person of ordinary skill in the art that the present disclosure may be implemented in certain ways other than the above embodiments without departing from the spirit or essential features thereof. Accordingly, the above explanation merely provides examples that are in no way limiting. The scope of the present disclosure is to be defined by the appended claims, not by the above explanation. Among all changes, various changes that are within the range of equivalents are considered to be included therein.

For example, the shape, arrangement, orientation, and number of the above-described components are not limited to the above explanation or the drawings. The shape, arrangement, orientation, and number of each component may be selected freely as long as the functions of the component can be achieved.

In each of the above embodiments, the first focal length has been described as longer than the second focal length f, but this configuration is not limiting. The first focal length may be equal to or less than to the second focal length f.

In each of the above embodiments, the third focal length has been described as longer than the fourth focal length f, but this configuration is not limiting. The third focal length may be equal to or less than to the fourth focal length f.

In the second and third embodiments, the monochromator 1 has been described as including the first slit 4a and the second slit 4b, but this configuration is not limiting. The monochromator 1 may be configured to include only the second slit 4b, without the first slit 4a.

In each of the above embodiments, the first lens 111 and the fourth lens 114 have been described as each having, in one lens, the function of a lens that converts light into collimated light and causes the light to be incident on the diffraction grating 3 and the function a lens that focuses diffracted light, but this configuration is not limiting. These functions may be realized by two different lenses that have substantially the same focal length.

In the second and third embodiments, the fifth lens 211 and the eighth lens 214 have been described as each having, in one lens, the function of a lens that converts light into collimated light and cause s the light to be incident on the diffraction grating 3 and the function of a lens that focuses diffracted light, but this configuration is not limiting. These functions may be realized by two different lenses that have substantially the same focal length.

In each of the above embodiments, a plane mirror arranged at a substantially right angle to the direction of propagation of the diffracted light from the diffraction grating 3 may be placed on the reflection side. This makes it easier for the diffracted light to be incident on the diffraction grating 3 again, thereby increasing the number of diffractions. The wavelength selectivity is therefore further improved.

In each of the above embodiments, the monochromator 1 may be mounted on any appropriate optical device, such as an optical spectrum analyzer.

The invention claimed is:

1. A first optical system comprising:
   a first lens configured to collimate incident light and guide the incident light to a diffraction grating that is rotatable about an axis of rotation;
   a second lens configured to collimate first diffracted light that was diffracted by the diffraction grating and focused at a first focal point by the first lens;
   a pair of first mirrors configured to direct the first diffracted light that passed through the second lens back toward the diffraction grating;
   a third lens configured to focus the first diffracted light directed back by the pair of first mirrors at a second focal point; and
   a fourth lens configured to collimate the first diffracted light that was focused by the third lens and guide the first diffracted light to the diffraction grating, wherein
   the first lens and the fourth lens have a substantially identical first focal length,
   the second lens and the third lens have a substantially identical second focal length,
   a first distance along an optical path from the first focal point to the second focal point is determined by a first predetermined condition, and
   the first predetermined condition includes a condition that a shift in a focusing position of the first diffracted light is inverted between the first focal point and the second focal point, the shift depending on an angle between an engraved line extending in one direction and the axis of rotation in the diffraction grating.

2. The first optical system according to claim 1, wherein the first predetermined condition includes a condition that the first distance is substantially four times the second focal length.

3. The first optical system according to claim 1, wherein the first focal length is longer than the second focal length.

4. A monochromator comprising:
   the first optical system according to claim 1;
   the diffraction grating; and
   a first slit positioned at a third focal point at which second diffracted light that was diffracted by the diffraction grating is focused by the fourth lens.

5. The monochromator according to claim 4, further comprising a second optical system, wherein
   the second optical system comprises:
   a fifth lens configured to collimate the second diffracted light that was focused at the third focal point by the fourth lens and guide the second diffracted light to the diffraction grating;
   a sixth lens configured to collimate third diffracted light that was diffracted by the diffraction grating and focused at a fourth focal point by the fifth lens;
   a pair of second mirrors configured to direct the third diffracted light that passed through the sixth lens back toward the diffraction grating;
   a seventh lens configured to focus the third diffracted light directed back by the pair of second mirrors at a fifth focal point; and
   an eighth lens configured to collimate the third diffracted light that was focused by the seventh lens and guide the third diffracted light to the diffraction grating,
   the fifth lens and the eighth lens have a substantially identical third focal length,
   the sixth lens and the seventh lens have a substantially identical fourth focal length,
   a second distance along an optical path from the fourth focal point to the fifth focal point is determined by a second predetermined condition, and
   the second predetermined condition includes a condition that a shift in a focusing position of the third diffracted light is inverted between the fourth focal point and the fifth focal point, the shift depending on an angle between the engraved line and the axis of rotation.

6. The monochromator according to claim 5, wherein the second predetermined condition includes a condition that the second distance is substantially four times the fourth focal length.

7. The monochromator according to claim 5, wherein the third focal length is longer than the fourth focal length.

8. The monochromator according to claim 5, further comprising a second slit positioned at a sixth focal point at which fourth diffracted light that was diffracted by the diffraction grating is focused by the eighth lens.

9. The monochromator according to claim 5, wherein the diffraction grating comprises
   a first diffraction grating configured to act optically on light together with the first optical system; and
   a second diffraction grating configured to act optically on light together with the second optical system, and
   the first diffraction grating and the second diffraction grating are configured as separate bodies from each other.

10. An optical apparatus comprising the monochromator according to claim 5.

* * * * *